UNITED STATES PATENT OFFICE.

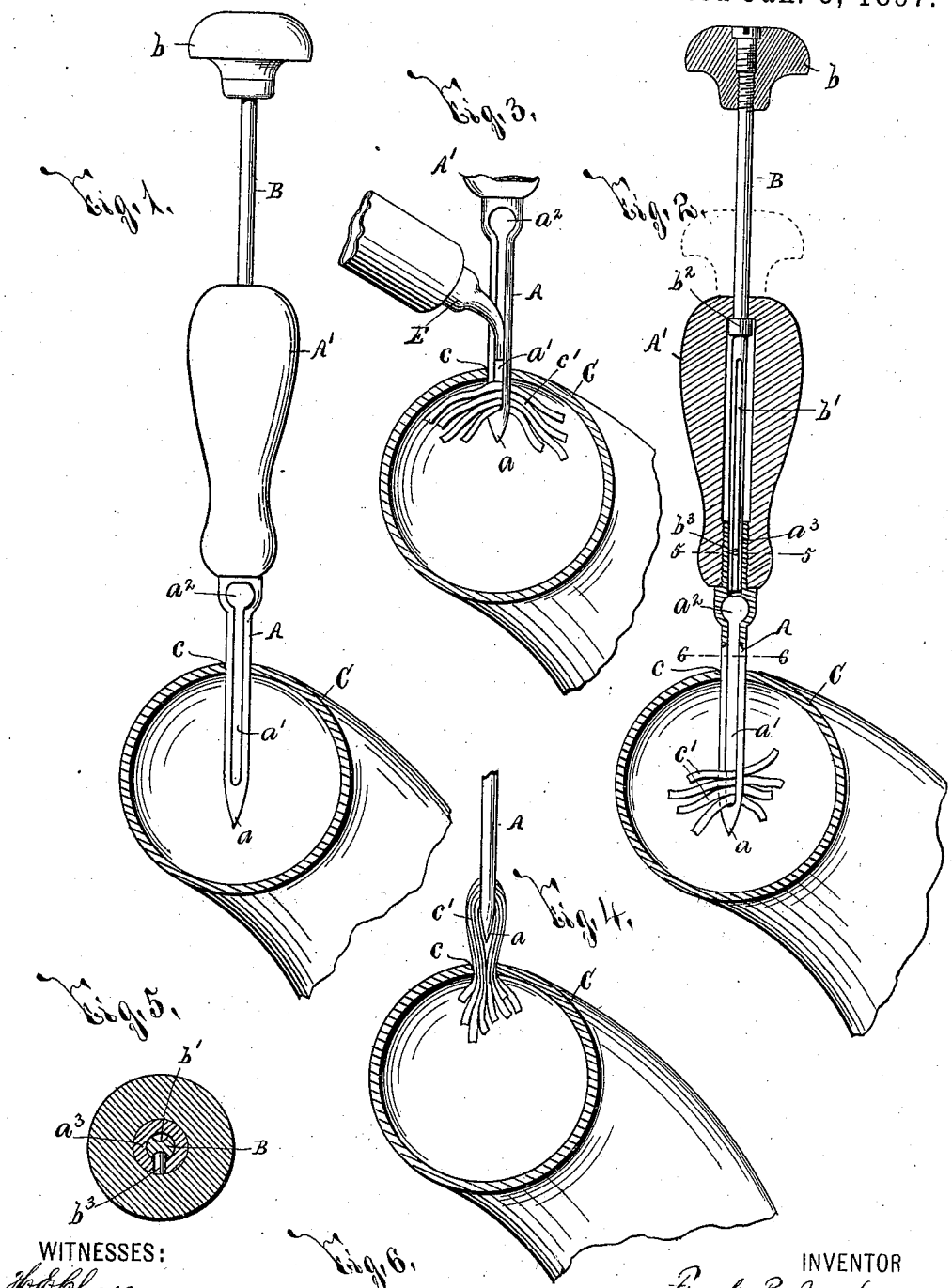

FRANK B. JENCKS, OF SYRACUSE, NEW YORK.

DEVICE FOR MENDING TIRES.

SPECIFICATION forming part of Letters Patent No. 574,608, dated January 5, 1897.

Application filed May 5, 1896. Serial No. 590,322. (No model.)

*To all whom it may concern:*

Be it known that I, FRANK B. JENCKS, of Syracuse, in the county of Onondaga, in the State of New York, have invented new and useful Improvements in Devices for Mending Tires, of which the following, taken in connection with the accompanying drawings, is a full, clear, and exact description.

My invention consists of an improved device for mending hose-pipe tires, and has for its object the production of a simple and efficient means for accomplishing the desired result, all as hereinafter more particularly described, and pointed out in the claims.

In specifying my invention reference is had to the accompanying drawings, forming part of this specification, in which like letters indicate corresponding parts in all the views.

Figure 1 is a side elevation of my improved tire-mending device, illustrated as operatively arranged in a puncture formed in a portion of a hose-pipe tire, shown in isometric. Fig. 2 is a vertical section, partly in elevation, of my improved mending device, a portion of the tire being shown in the same position as in Fig. 1 and a number of the strips of the mending material being operatively arranged within the slot of the needle of the mending device. Fig. 3 is an elevation of the detached lower end of my mending device, one extremity of a cement-feeding tube and a portion of a hose-pipe tire being illustrated in isometric. Fig. 4 is an edge elevation of the lower end of the needle of my mending device, shown as withdrawn from a puncture in a portion of the tire, illustrated in isometric, said needle being engaged with strips of the mending material for partially withdrawing the same from the puncture and thereby compressing the strips within the puncture; and Figs. 5 and 6 are horizontal sections taken, respectively, on lines 5 5 and 6 6, Fig. 2, the push-rod or plunger being shown in section in Fig. 6.

A represents a needle, B a push-rod or plunger, and A' $b$ handles for manipulating said push-rod or plunger, all of which parts may be of any desirable form, size, and construction. The needle A is provided with a point $a$ for facilitating its entrance in the puncture $c$ in a tire C, and is formed with a lengthwise slot $a'$, an eye $a^2$ at the upper end of said slot, and a hollow shank $a^3$. The push-rod or plunger B is reciprocally movable in the shank $a^3$ and the slot $a'$ of the needle A, and is provided with oppositely-arranged longitudinal grooves $b'$, alined with the slot $a'$ and opening thereinto. A suitable shoulder $b^2$ is provided upon the push-rod or plunger B for limiting its movement, and a pin $b^3$ is secured to the shank $a^3$ and projects into one of the grooves $b'$ for preventing revoluble movement of said push-rod or plunger.

In the operation of my invention strips of rubber or other elastic material $c'$ are arranged one by one within the slot $a'$ by inserting the same through the eye $a^2$ and are forced into the interior of the tire C, through the puncture $c$, by depressing the push-rod or plunger B. When a sufficient number of the strips $c'$ has been inserted, the needle A is withdrawn, as clearly illustrated at Fig. 4, thereby compressing the strips within the puncture or orifice $c$ and completely filling the same. A suitable tool, as a pair of shears or a knife, may then be used to sever the projecting portions of the strips $c'$ in close proximity to the outer face of the tire, whereupon the tire will be quickly and neatly mended.

In practice the expansion of the strips $c'$ is sufficient to thoroughly and effectively close the puncture $c$; but, if desired, any suitable cement may be applied to said strips by a feeding-tube E, Fig. 3, before the needle A is withdrawn to compress the strips within the puncture.

The operation of my mending device will now be readily understood upon reference to the foregoing description and the accompanying drawings, and it will be particularly noted that I do not herein specifically limit myself to the exact detail construction and arrangement of the component parts of said mending device.

Having thus fully described my invention, what I claim as new, and desire to secure by Letters Patent, is—

1. A tire-mending device consisting of a slotted needle provided with a hollow shank, and a push-rod or plunger movable in the shank and the slot of the needle, said needle and push-rod being provided with suitable handles, substantially as and for the purpose described.

2. In a tire-mending device, the combination of a slotted needle provided with a handle, a hollow shank and an eye or opening for inserting strips of the mending material; of a sliding push-rod or plunger movable in the shank and the slot of the needle for forcing said strips of mending material into the tire, substantially as and for the purpose set forth.

3. A tire-mending device consisting of a combined needle and push-rod or plunger sliding within the needle, said needle being provided with suitable openings for the insertion of tire-mending material, substantially as and for the purpose specified.

4. A tire-mending device, consisting of a slotted needle, and a push-rod or plunger movable in the slot of the needle, and provided with a lengthwise groove, substantially as and for the purpose set forth.

5. A tire-mending device consisting of a slotted needle, and a push-rod or plunger movable in the slot of the needle and provided with oppositely-arranged lengthwise grooves alined with said slot and opening thereinto, substantially as and for the purpose specified.

In testimony whereof I have hereunto signed my name, in the presence of two attesting witnesses, at Syracuse, in the county of Onondaga, in the State of New York, this 28th day of April, 1896.

FRANK B. JENCKS.

Witnesses:
K. H. THEOBALD,
H. E. CHASE.